United States Patent
Tate et al.

(10) Patent No.: US 11,004,342 B2
(45) Date of Patent: May 11, 2021

(54) TURN LANE PEDESTRIAN INDICATOR

(71) Applicant: Dick Campbell Company, Boise, ID (US)

(72) Inventors: Phil Tate, Boise, ID (US); Tony Brennan, Boise, ID (US); Juan Molina, Boise, ID (US); Josh Meier, Boise, ID (US)

( * ) Notice: Subject to any disclaimer, the term of this patent is extended or adjusted under 35 U.S.C. 154(b) by 0 days.

(21) Appl. No.: 16/893,316

(22) Filed: Jun. 4, 2020

(65) Prior Publication Data

US 2020/0388158 A1    Dec. 10, 2020

Related U.S. Application Data

(60) Provisional application No. 62/857,132, filed on Jun. 4, 2019.

(51) Int. Cl.
| | |
|---|---|
| *G08G 1/005* | (2006.01) |
| *G08G 1/16* | (2006.01) |
| *H04W 4/44* | (2018.01) |
| *G08G 1/09* | (2006.01) |

(52) U.S. Cl.
CPC ............ *G08G 1/166* (2013.01); *G08G 1/005* (2013.01); *G08G 1/09* (2013.01); *H04W 4/44* (2018.02)

(58) Field of Classification Search
CPC .......... G08G 1/166; G08G 1/005; G08G 1/09; H04W 4/44
See application file for complete search history.

(56) References Cited

U.S. PATENT DOCUMENTS

| | | | |
|---|---|---|---|
| 4,736,186 A | 4/1988 | Jones | |
| 4,843,337 A | 6/1989 | Conn | |
| 5,559,509 A | 9/1996 | Ogle | |
| 6,222,462 B1 | 4/2001 | Hahn | |
| 6,266,903 B1 | 7/2001 | Collins | |
| 6,384,742 B1 | 5/2002 | Harrison | |
| 6,556,148 B2 | 4/2003 | Ellis | |
| 8,571,743 B1 * | 10/2013 | Cullinane | G05D 1/00 701/23 |
| 2005/0128105 A1 * | 6/2005 | Green | H02S 20/20 340/944 |
| 2009/0091474 A1 | 4/2009 | Konforty | |

(Continued)

FOREIGN PATENT DOCUMENTS

| | | |
|---|---|---|
| AU | 2007276730 A1 | 2/2008 |
| CA | 2441644 A1 | 3/2005 |

(Continued)

*Primary Examiner* — Munear T Akki
(74) *Attorney, Agent, or Firm* — Scott Swanson; Shaver & Swanson, LLP (57) ABSTRACT

Conflicts and collisions between right-turning vehicles and pedestrians are a common problem in the field of traffic engineering. The present invention provides a visual indication that a pedestrian intends to cross as well as a wireless Infrastructure-to-Vehicle (I2V) message transmitted to nearby connected vehicles warning of the pedestrian's intent. Some embodiments may include a second visual indication and I2V message at the beginning of the Walk interval to warn drivers that a pedestrian is entering the crossing. The visual indication can include a lighted dynamic sign and/or light fixture configured to draw the attention of a driver of a vehicle.

20 Claims, 8 Drawing Sheets

(56) References Cited

U.S. PATENT DOCUMENTS

| | | | |
|---|---|---|---|
| 2010/0148989 A1 | 6/2010 | Hawkins | |
| 2010/0214129 A1 | 8/2010 | Brualla Marti | |
| 2012/0319868 A1 | 12/2012 | Kupczyn | |
| 2019/0035262 A1* | 1/2019 | Brady | G08G 1/005 |
| 2019/0197883 A1* | 6/2019 | Camras | G08G 1/166 |

FOREIGN PATENT DOCUMENTS

| | | |
|---|---|---|
| JP | 2001338778 A | 12/2001 |
| WO | WO-2014/125149 A1 | 8/2014 |

\* cited by examiner

TURN LANE PEDESTRIAN INDICATOR

PRIORITY/CROSS-REFERENCE TO RELATED APPLICATIONS

This application claims the benefit of U.S. Provisional Application No. 62/857,132, filed Jun. 4, 2019 the disclosure of which is incorporated by reference.

TECHNICAL FIELD

The disclosure generally relates to the field of traffic signaling. Particular embodiments relate to signaling to vehicles that a pedestrian is about to cross a roadway and/or crossing a roadway.

BACKGROUND

Pedestrian safety is of the utmost importance to the traffic industry. The exclusive turn lane has been identified as a difficult subject for designers of transportation infrastructure. For example, Right Turn on Red allows the driver to creep up to the stop bar and make the right turn when traffic allows.

Many times, a pedestrian is prepared to cross the street where the vehicle in waiting to make the right turn. The driver of the vehicle is typically focused on the vehicular traffic and is not adequately monitoring the crossing initiation area for potential pedestrians crossing directly in front of them.

Unfortunately, and all too often the traffic lets up at the same time the pedestrian gets the walk sign. The driver, focused on vehicular traffic, initiates the right turn at the same time the pedestrian is initiating the crossing. The pedestrian can be in trouble.

An additional danger is present due to right turn on green scenarios. Often times a crossing parallel to the initial direction of the turning vehicle will enter its walk stage at the same time that the turning vehicle gets a green light, leading both the pedestrian and the driver to believe that their path is clear.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is a turn lane pedestrian indicator to provide the driver of the vehicle with an indication that a pedestrian has placed a call and will be entering the crosswalk with the next walk cycle.

Preferably the turn lane pedestrian indicator utilizes a visual indication mounted in view of the turning vehicle in a way that draws attention towards the pedestrian, informing (communicating to) the driver to anticipate that a pedestrian will be in the crosswalk when the walk cycle is initiated.

In a preferred embodiment, the turn lane pedestrian indicator infrastructure to vehicle broadcast will initiate a wireless (such as 5G NR) signal to the vehicle that the pedestrian has requested a walk cycle and will be entering the crosswalk when the walk cycle is initiated.

In a preferred embodiment the components of the turn lane pedestrian indicator include, but are not limited to, a pedestrian call switch—including a signal power interface, a turn lane pedestrian indicator visual indication—preferably a dynamic illuminated sign configured to attract the attention of a driver proximate to the cross walk, a turn lane pedestrian indicator interface unit—preferably with wireless modules for infrastructure-to-vehicle (I2V) communication and wireless communication of calls and walk signal state to the visual indication, a solar panel and battery to power the visual indication, and a light fixture actuated by the call switch intended to illuminate the pedestrian waiting to cross.

The pedestrian call switch stations interact with the turn lane pedestrian indicator interface unit, which communicates wirelessly with the visual indication. The wireless signal from the turn lane pedestrian indicator interface unit initiates a visual indication—preferably a lighted dynamic sign—and a wireless I2V message broadcast to proximate vehicles, when a pedestrian call switch closes and/or when the walk signal changes state.

In a first disclosed preferred embodiment the visual and I2V turn lane pedestrian indicator indications are active; the I2V communication broadcasts when the pedestrian places a call and the visual indication is lighted in a steady on from the time the pedestrian places the call to the time the walk cycle and the walk display is active. In low light situations, the light fixture will turn on such that the light fixture illuminates the pedestrian. All indications go inactive when the walk sign comes up, and remain inactive until the next pedestrian call is placed.

Alternatively in a second preferred embodiment, the I2V indication broadcasts when the pedestrian places a call and the visual indication and/or light fixture activate until the walk display activates. At the start of the walk cycle, another I2V indication broadcasts and the visual indication changes to a "flashing" or "blinking" pattern. At the end of the walk cycle, when the "flashing don't walk" stage begins, the visual indication and light fixture turn off until another pedestrian call is placed.

An example configuration of the interaction and activation of the turn lane pedestrian indicator by the system is as follows:

| Status | Turn lane pedestrian indicator | Turn lane pedestrian indicator w/active flasher |
|---|---|---|
| Solid Don't Walk - not actuated | Visual indication and light fixture inactive | Visual indication and light fixture inactive |
| Solid Don't Walk - actuated | Visual indication and light fixture active, I2V indication broadcasts | Visual indication and light fixture active, I2V indication broadcasts |
| Walk | Visual indication and light fixture inactive | Visual indication active with flashing pattern, light fixture active, I2V indication broadcasts |
| Flashing Don't Walk - not actuated | Visual indication and light fixture inactive | Visual indication and light fixture inactive |
| Flashing Don't Walk - actuated | Visual indication and light fixture active, I2V indication broadcasts | Visual indication and light fixture active, I2V indication broadcasts |
| Solid Walk - actuated | Visual indication and light fixture active, I2V indication broadcasts | Visual indication and light fixture active, I2V indication broadcasts |

The visual indication is preferably mounted proximate to the crossing initiation point in a manner to draw the driver's attention toward the pedestrian. The optional light fixture, if separate from the visual indication, is mounted to illuminate the position where a pedestrian is likely to stand waiting to cross.

Possible visual indication characteristics include, but are not limited to:

An array of LEDs mounted on or near the pedestrian signal head (also called the "ped head").

A standard R10-15 sign with embedded LEDs around its perimeter.

A standard R10-15 sign with an illuminated "walking person" emblem.

A standard R10-15 sign with an LED array mounted in the arrow indicating the position of the crosswalk relative to the turning motion.

A "blank out" sign, which appears blank until receiving a call from the pedestrian button, at which point it displays a standard R10-15 sign design.

The visual indication can be configured with a plurality of lights. The plurality of lights can be configured to illuminate in unity or partially to provide varying signals to the vehicle, such as the pedestrian is preparing to enter the crosswalk or has entered the crosswalk. The term crosswalk is used to indicate the position at which the pedestrian is crossing the intersection, without specifically requiring lines or other indicators on or in the roadway to indicate the crosswalk. Multiple visual indications can be utilized to increase notification potential. The turn lane pedestrian indicator interface can be configured to communicate with the pushbutton and traffic cabinet controlling the intersection, and with the visual indication. This communication is preferably configured to occur by wireless communication. A variety of technologies can be utilized for wireless communication, including but not limited to 5G or DSRC.

The wireless I2V indication in a preferred embodiment comes from an antenna integral to the visual indication enclosure. When the turn lane pedestrian indicator is active the wireless beacon broadcasts an I2V signal to proximate vehicles, in order to communicate the intention of the pedestrian in interfacing with the call switch. The I2V signal provides a signal to the computer that is onboard the vehicle.

The pedestrian call switch systems preferably include a signal power interface device. This device may also power the visual indication and light fixture directly. In another preferred embodiment, the visual indication and light fixture may be powered through remote means such as a solar panel and/or battery. The signal power interface installs in the ped head, and may connect to the turn lane pedestrian indicator interface by a wired connection or through wireless communication.

A 6-conductor cable is preferably utilized to connect the pedestrian call switch to the signal power interface (four wires from signal power interface to pedestrian call switch). The turn lane pedestrian indicator interface may be connected to the call switch and signal power interface through a wired connection, or through wireless communication. In a preferred embodiment, the visual indication and light fixture are connected to the turn lane pedestrian indicator interface through wireless communication.

The turn lane pedestrian indicator visual indication preferably mounts proximate to the crosswalk initiation point and is controlled through wireless communication by the pedestrian call switch and signal power interface.

In a preferred embodiment the visual indication and light fixture are configured to receive power through remote means such as a solar panel and battery, and signal state information from the walk sign power connections transmitted wirelessly, although alternative power and/or signal state information source(s) can be utilized.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature

DETAILED DESCRIPTION OF THE PREFERRED EMBODIMENTS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 1:
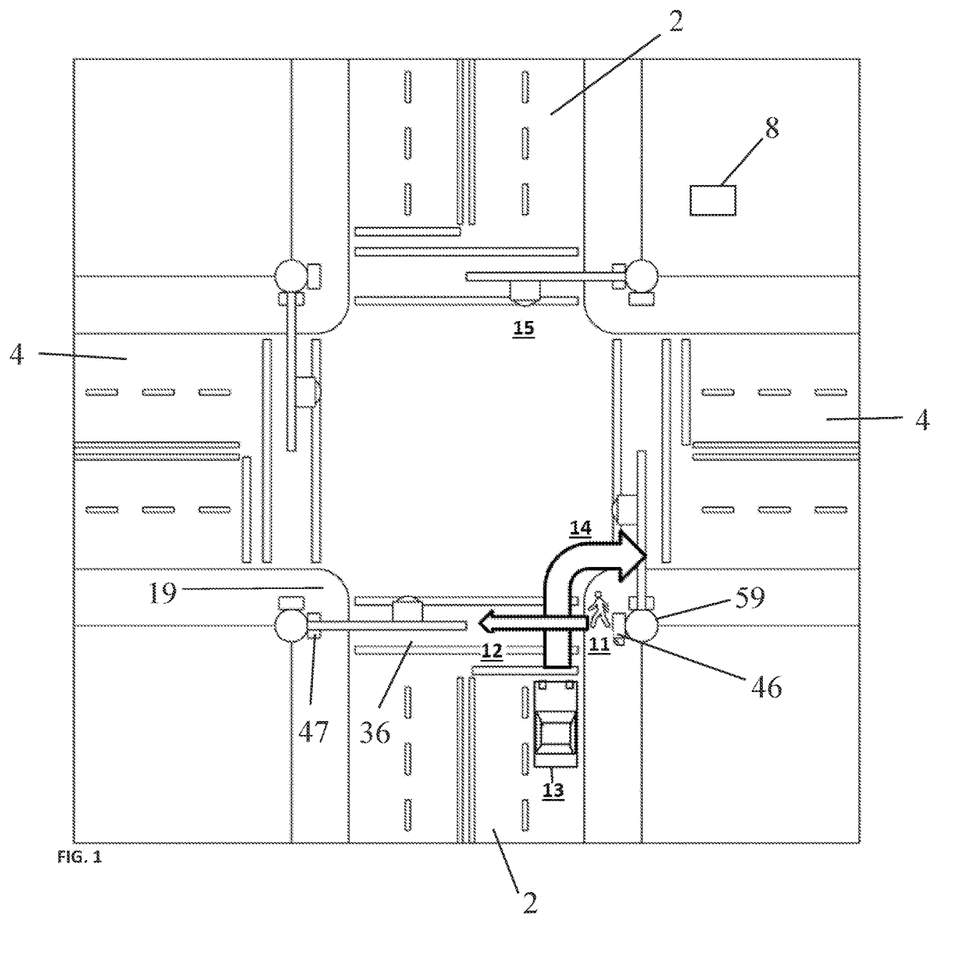
FIG. 1 depicts a problem scenario where a pedestrian intends to cross a street from right to left across a crosswalk while a vehicle is stopped at a red light and waiting to turn right on red.
Figure 2:
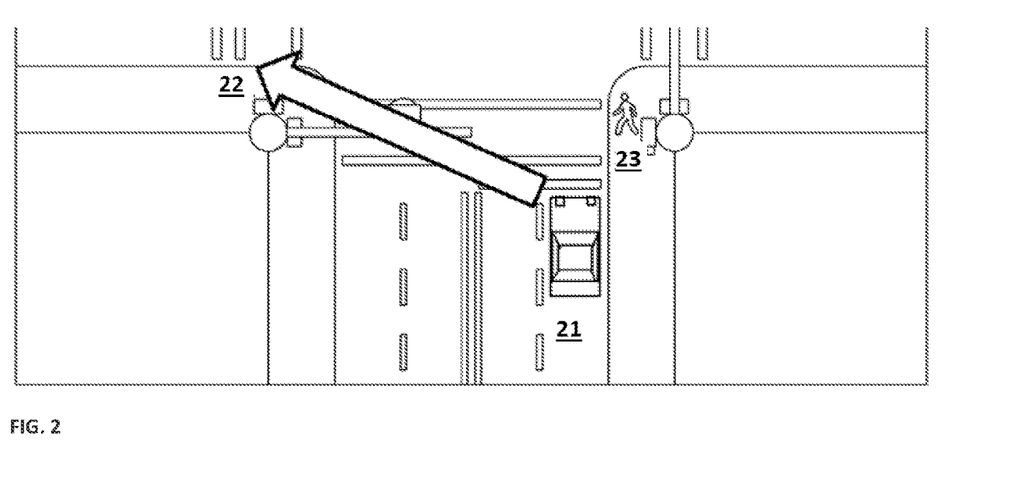
FIG. 2 depicts the typical direction the driver of the vehicle is looking while determine a gap in cross-traffic such that the vehicle can turn right on red often without looking for pedestrians who intend to cross the street in front of the vehicle in an opposite direction from cross-traffic traveling from left to right in the image.
Figure 3:
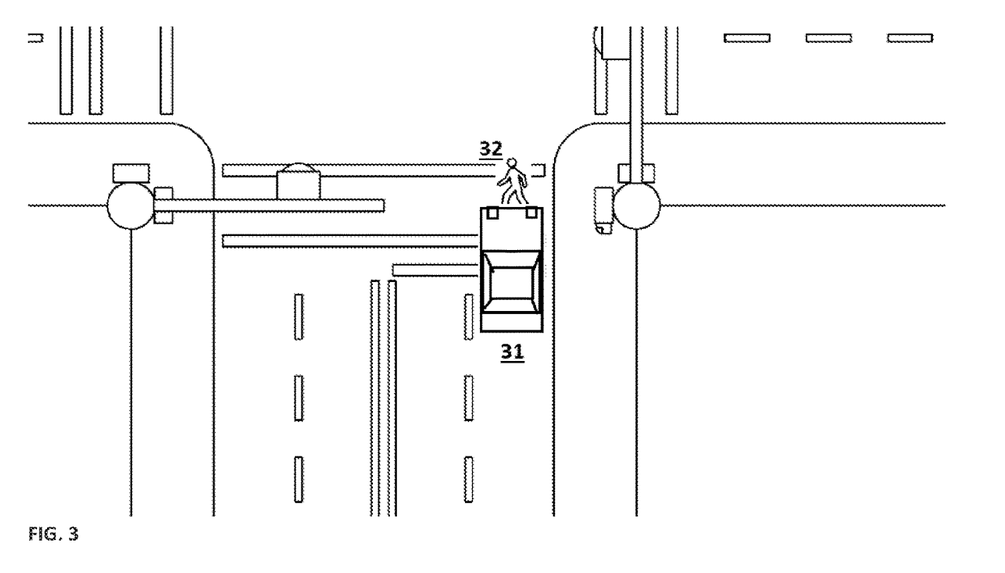
FIG. 3 depicts a worst-case scenario of the event shown in FIGS. 1 and 2, in which the car initiates turning right when the pedestrian is in the crosswalk or entering the crosswalk.

FIGS. 1, 2 and 3 illustrate a problem faced by a vehicle turning right at a red light when a pedestrian is preparing to cross in front of the vehicle from right to left. FIG. 1 provides an illustration of a typical situation in which a vehicle is positioned in a right turn only lane preparing to turn right at the intersection. The arrow 14 indicates the vehicle's intended path. The driver of the vehicle is typically looking to the left (indicated in FIG. 2) to view oncoming traffic to time the vehicle's turn at the intersection. This left view is shown in FIG. 2. A pedestrian is shown at the intersection attempting to cross the intersection. The pedestrian has activated the call switch, but the driver of the vehicle does not have a visual signal indicating the presence of the pedestrian and will not be alerted to the presence of the pedestrian unless the driver sees the pedestrian.

More specifically, FIG. 1 depicts a problem scenario where a pedestrian 11 intends to cross the street in direction 12 while a car 13 stopped at a red light 15 waits to turn right on red in direction 14. The pedestrian has activated the call switch positioned on the traffic pole 16 at lower right corner of the intersection. The pedestrian call switch is positioned beneath the ped head 46 which typically displays a walk, do not walk, or flashing do not walk signal to a pedestrian waiting to cross from the opposite side 19 of the crosswalk. The ped head 47 at the opposite side of the intersection signals to the pedestrian 11 when the lights of the intersection are in the correct phase so as to allow the pedestrian to cross at the pedestrian crossing FIG. 2 depicts the car 21 intending to turn right on red, looking in direction 22 for a gap in the cross-traffic and not looking at the pedestrian 23 who intends to cross the street. FIG. 3 depicts the worst-case scenario, in which the car 31 turns right on red at the same moment that the pedestrian 32 enters the crossing.

Figure 4:
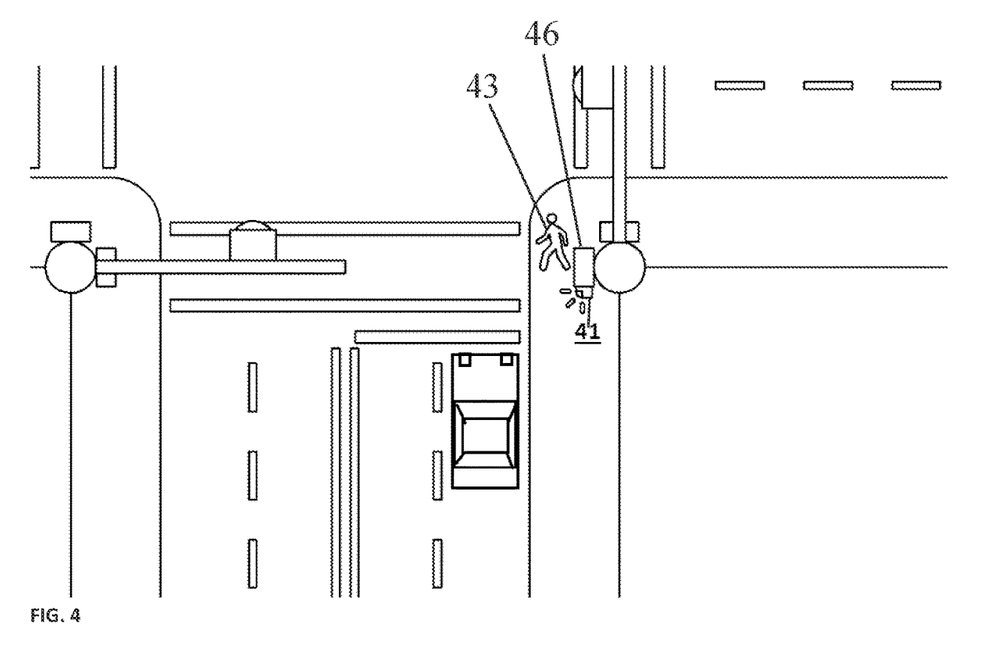
FIG. 4 depicts a first visual indication and wireless "Infrastructure to Vehicle" (I2V) transmission intended to draw the driver's attention toward the pedestrian waiting to cross.
Figure 5:
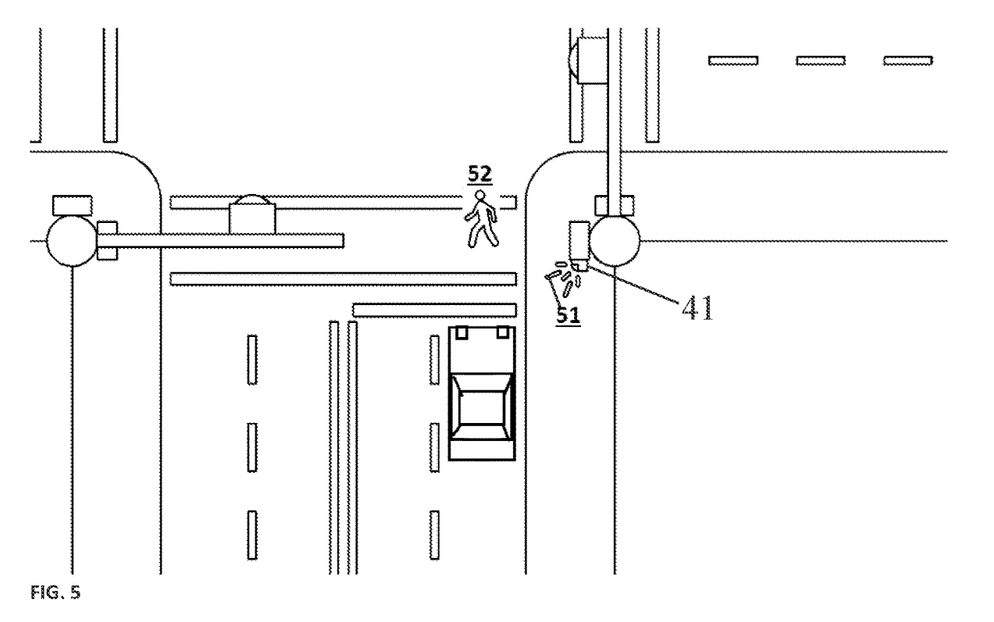
FIG. 5 depicts a second type of visual indication and wireless I2V transmission that occurs when the walk interval begins and the pedestrian enters the crossing.

FIGS. 4 and 5 illustrate an embodiment of a solution to the problem presented in FIGS. 1, 2, and 3. The pedestrian 43 preparing to cross the intersection has activated a visual indication 41 to attract the attention of the vehicle positioned at the intersection. The visual indication is positioned and configured to attract the attention of a vehicle 44 stopped or approaching the position of the vehicle depicted toward the position of the pedestrian preparing to cross the street. The visual indication can be configured to illuminate and/or flash when activated by the pedestrian. The visual indication can be configured to be activated when the pedestrian activates the pedestrian call switch. The visual indication can be configured with multiple light embodiments, such as different flash rates, brightness, and/or color to alert the vehicle to a pedestrian preparing to enter the crosswalk or when a pedestrian has already entered the crosswalk. In FIG. 4 the visual indicator is connected to what is commonly referred to as the ped head 46, which is the display that indicates to a pedestrian to walk or stop. In a further embodiment a first light can be utilized to provide notification of a pedestrian preparing to enter the intersection and a second light utilized to provide notification of the pedestrian entering the intersection. More specifically, FIG. 4 depicts a possible solution to this problem; the solution includes a visual indication and/or wireless "Infrastructure to Vehicle" (I2V) transmission intended to draw the driver's attention towards the pedestrian waiting to cross 43. FIG. 4 depicts a possible solution to this problem; the solution includes a visual indication 41 and wireless "Infrastructure to Vehicle" (I2V) transmission intended to draw the driver's attention towards the pedestrian waiting to cross.

FIG. 5 depicts an option for a second type of visual indication 51 and wireless I2V transmission that occurs when the walk interval begins and the pedestrian 52 enters the crossing. FIG. 5 further depicts a wireless beacon (signal) 54 broadcast from an antenna that is integral to or connected to the visual strobe 51. When the Turn Lane Pedestrian Indicator is active the wireless beacon broadcasts a signal to indicate the intentions of the pedestrian in an infrastructure to vehicle (I2V) signal.

Figure 6:
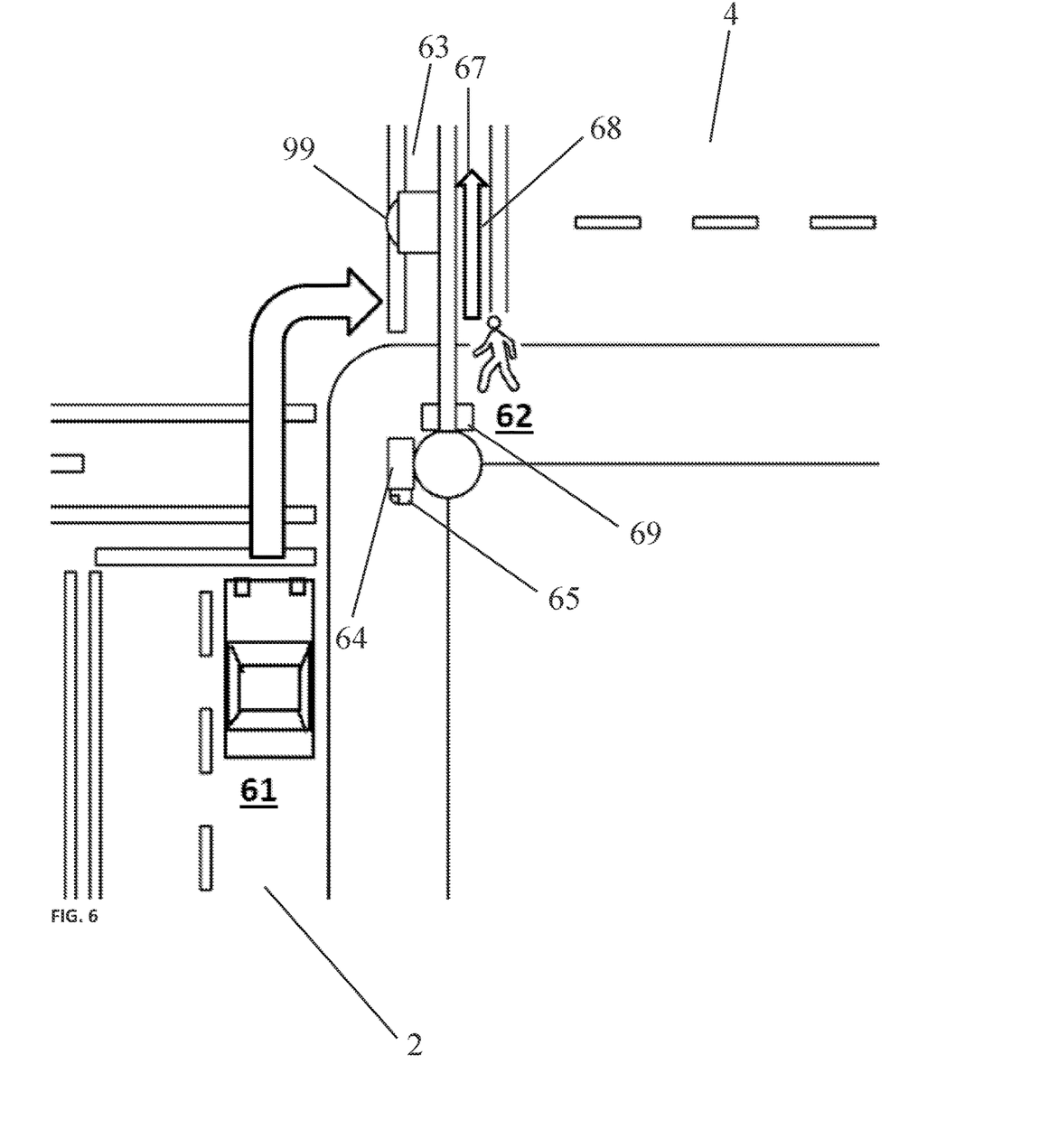
FIG. 6 depicts a further problem scenario similar to FIGS. 1-3 in which a driver of a vehicle intends to turn right on a green light while a pedestrian intends to cross the street parallel to the vehicle's initial position.

FIG. 6 illustrates an additional potential conflict between a vehicle turning right on green and a pedestrian crossing parallel to the vehicle's initial position. A driver of the vehicle 61 intends to turn right on a green light (not shown) at the same moment that a pedestrian 62 intends to cross the street in a crosswalk 63 parallel 67 to the first roadway. As in FIGS. 1 and 2, the driver of the vehicle is looking away from the pedestrian and the crosswalk 63 the pedestrian intends to cross at. When the driver views an opening in traffic, the driver may not look to the driver's right in the direction of the pedestrian. This could lead to a collision between the driver's vehicle and the pedestrian. Installing the visual indicator 65 on either the pedestrian signal head 64 directed across the first roadway 2 and/or on the pedestrian signal head 69 directed across the second roadway 4. In general when the pedestrian is provided with a walk signal from the opposing pedestrian signal head (not shown in FIG. 6), the signal light 99 controlling traffic on the roadway 4 crossing the crosswalk 63 is red. However, traffic turning onto the second roadway 4 from the first roadway 2 will have a green light, conflicting with the walk signal displayed to the pedestrian.

Figure 7:
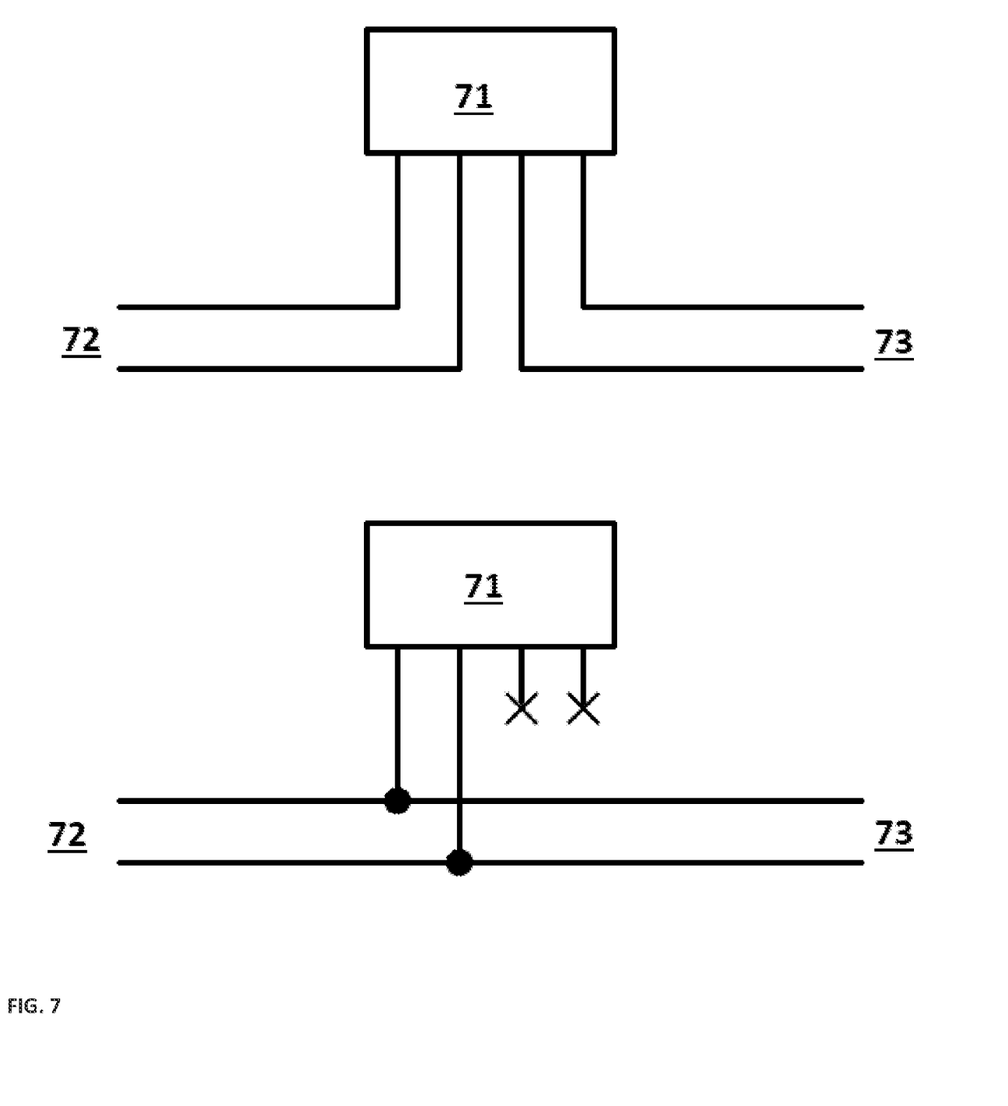
FIG. 7 depicts two wiring configurations allowable by a preferred embodiment of the invention.

FIG. 7 provides two preferred options for connecting the turn lane pedestrian indicator interface 71 to respond to one button only or to all buttons on a phase, although alternate options may be utilized. In a first wiring configuration, a pushbutton 72 transmits a signal to the present invention 71 via one pair of wires, and the present invention transmits the same signal to the traffic controller 73 via a second pair of wires. In a second wiring configuration, the pushbutton 72 transmits a signal to both the present invention 71 and the traffic controller 73 via the same pair of wires. It is understood that these connections can be made through wired or wireless means.

Figure 8:
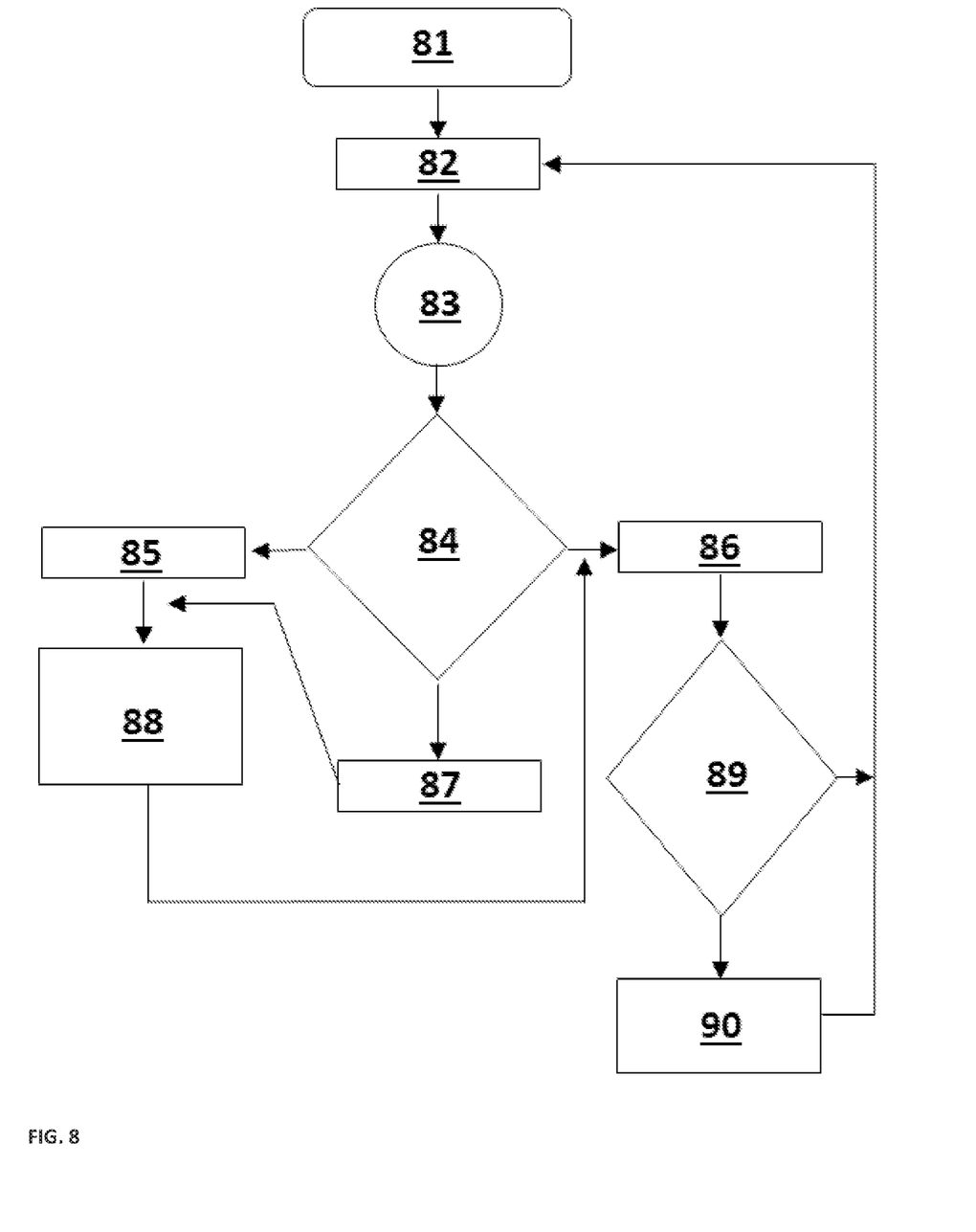
FIG. 8 depicts a flow chart of the operation of a typical embodiment of the invention.

FIG. 8 depicts a flow chart of operation of a preferred embodiment of the invention. In a preferred embodiment the present invention turn lane pedestrian indicator begins in the inactive state 82 until a button press event 83 occurs. In the event of a button press 83, the present invention determines the signal state of the walk sign. If the signal state of the walk sign is Don't Walk 85 or Flashing Don't Walk 87, the present invention displays a corresponding visual indication and transmits a wireless I2V signal 88 to nearby connected vehicles. If the signal state of the walk sign is Walk 86 then a preferred embodiment of the invention will display a second corresponding visual indication and transmit a second wireless I2V signal 90 before returning to the inactive state 82. In other embodiments if the walk sign state is Walk 86 then the invention will return to the inactive state 82.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A turn lane pedestrian indicator for use at an intersection of at least two roadways comprising a first roadway and a second roadway, said turn lane pedestrian indicator comprising:
   a pedestrian call switch positioned on a traffic pole at an intersection of at least two roadway at a crossing initiation point, wherein said pedestrian call switch is positioned and configured to be activated by a pedestrian intending to cross at a pedestrian crossing at said intersection such that said pedestrian crossing is positioned such that a vehicle intending to turn from the first roadway onto the second roadway is required to cross the pedestrian crossing to turn from said first roadway to said second roadway;

a pedestrian signal head positioned on said traffic pole, wherein said pedestrian signal head is selectively configured to display a walk signal to a pedestrian to cross said pedestrian crossing;

a turn lane pedestrian indicator interface in communication with a traffic controller, wherein said pedestrian call switch is in communication with said traffic controller, wherein said traffic controller is configured to control said traffic control lights and configured to control said pedestrian signal head to selectively display said walk signal at said intersection when said pedestrian call switch is activated by the pedestrian intending to cross at said pedestrian crossing at said intersection, a visual indicator positioned proximate to said crossing initiation point and configured to draw the attention of a driver of the vehicle intending to turn toward said visual indicator to warn the driver of the vehicle that said pedestrian is waiting to cross, wherein said visual indicator comprises at least one light configured to illuminate and/or flash when activated by said turn lane pedestrian indicator interface, wherein said at least one light is directed at the vehicle, wherein said pedestrian indicator interface is configured to activate said visual indicator when the pedestrian activates said pedestrian call switch and immediately before or when said traffic controller causes said pedestrian signal head to display said walk signal; and a power source configured to power said visual indicator.

2. The turn lane pedestrian indicator of claim 1 wherein said turn lane pedestrian indicator is configured to activate the by wireless communication.

3. The turn lane pedestrian indicator of claim 1 wherein said turn lane pedestrian indicator interface is configured to communicate with the visual indicator by wireless communication.

4. The turn lane pedestrian indicator of claim 1 wherein said turn lane pedestrian indicator comprises an infrastructure-to-vehicle beacon configured to communicate to a computer onboard said vehicle.

5. The turn lane pedestrian indicator of claim 4, wherein said wireless infrastructure-to-vehicle beacon is configured communicate to said computer onboard said vehicle when the turn lane pedestrian indicator receives a signal that a pedestrian has activated the walk display in a pedestrian signal head.

6. The turn lane pedestrian indicator of claim 5, wherein the visual indicator and wireless infrastructure-to-vehicle beacon are configured to be active from the time the pedestrian has requested the walk cycle until the walk cycle is active.

7. The turn lane pedestrian indicator of claim 1, wherein the visual indicator is configured to be active from the time the pedestrian has requested the walk cycle until the walk cycle is active.

8. The turn lane pedestrian indicator of claim 1, wherein the visual indicator is configured to be non-active on a pedestrian signal head with an active walk display.

9. The turn lane pedestrian indicator of claim 1, wherein the visual indicator is configured to be active in flashing mode on a pedestrian signal head with an active walk display.

10. The turn lane pedestrian indicator of claim 9, wherein the flashing mode is configured to provide a flashing pattern via the visual indicator during the active walk cycle.

11. The turn lane pedestrian indicator of claim 1, wherein said turn lane pedestrian indicator comprises a plurality of visual indicators.

12. The turn lane pedestrian indicator of claim 1 wherein said turn lane pedestrian indicator power source is a remote power source.

13. The turn lane pedestrian indicator of claim 12, wherein said remote power source comprises a solar panel and battery.

14. The turn lane pedestrian indicator of claim 1 wherein said turn lane pedestrian indicator power source comprises a connection to at least one power output from the traffic control cabinet in the pedestrian signal head.

15. The turn lane pedestrian indicator of claim 1 wherein said visual indicator is attached to the pedestrian signal head.

16. The turn lane pedestrian indicator of claim 1, wherein said traffic controller comprises a traffic control cabinet.

17. The turn lane pedestrian indicator of claim 1, wherein said visual indicator is mounted on said traffic pole.

18. The turn lane pedestrian indicator of claim 1, wherein said visual indicator comprises a dynamic illuminated sign.

19. The turn lane pedestrian indicator of claim 18, wherein said dynamic illuminated sign is selected from the group consisting of an array of LEDs mounted on or near a pedestrian signal head attached to said traffic pole, a yield to pedestrian sign with embedded LEDs around its perimeter, a yield to pedestrian sign with an "walking person" emblem thereon configured for illumination, a yield to pedestrian sign comprising an illuminable arrow indicating the position of the crosswalk relative to the location of the vehicle, and a blank sign configured for illumination to display a yield to pedestrian sign.

20. The turn lane pedestrian indicator of claim 1, wherein said pedestrian call switch is in communication with said traffic controller via said turn lane pedestrian indicator interface.

* * * * *